(12) United States Patent
Zheng et al.

(10) Patent No.: US 12,452,299 B2
(45) Date of Patent: Oct. 21, 2025

(54) METHOD AND APPARATUS FOR IDENTIFYING MALICIOUS MINING BEHAVIOR, AND DEVICE AND STORAGE MEDIUM

(71) Applicant: DBAPPSECURITY CO., LTD, Zhejiang (CN)

(72) Inventors: Yunchao Zheng, Zhejiang (CN); Yuan Fan, Zhejiang (CN); Jin Huang, Zhejiang (CN)

(73) Assignee: DBAPPSECURITY CO., LTD, Zhejiang (CN)

( * ) Notice: Subject to any disclaimer, the term of this patent is extended or adjusted under 35 U.S.C. 154(b) by 233 days.

(21) Appl. No.: 18/278,856

(22) PCT Filed: Jun. 30, 2021

(86) PCT No.: PCT/CN2021/103572
§ 371 (c)(1),
(2) Date: Aug. 25, 2023

(87) PCT Pub. No.: WO2022/222270
PCT Pub. Date: Oct. 27, 2022

(65) Prior Publication Data
US 2024/0137385 A1    Apr. 25, 2024
US 2024/0236144 A9    Jul. 11, 2024

(30) Foreign Application Priority Data

Apr. 23, 2021    (CN) .......................... 202110463363.9

(51) Int. Cl.
H04L 9/40    (2022.01)
(52) U.S. Cl.
CPC ........ H04L 63/145 (2013.01); H04L 63/1416 (2013.01); H04L 63/1425 (2013.01)

(58) Field of Classification Search
CPC .............. H04L 63/145; H04L 63/1416; H04L 63/1425; H04L 9/0866; H04L 9/50; G06Q 20/382; G06Q 20/325; G06Q 20/367
See application file for complete search history.

(56) References Cited

U.S. PATENT DOCUMENTS 11,436,620 B2 *  9/2022  Stanciu .................... H04L 9/50
2019/0295069 A1 * 9/2019  Pala ..................... G06Q 20/367
(Continued)

FOREIGN PATENT DOCUMENTS

CN    108829829 A    11/2018
CN    108900496 A    11/2018
(Continued)

OTHER PUBLICATIONS

International Search Report for PCT/CN2021/103572 mailed Jan. 19, 2022, ISA/CN.

Primary Examiner — Richard G Keehn
(74) Attorney, Agent, or Firm — Yue (Robert) Xu; Apex Attorneys at Law, LLP (57) ABSTRACT

Provided are a method and apparatus for identifying a malicious mining behavior, an electronic device, and a storage medium. The method includes: obtaining operation data corresponding to a target operation, on capturing of the target operation; extracting a wallet address from the operation data to obtain a wallet address set obtaining data of a network outgoing connection for external access, and determining whether the data of the network outgoing connection comprises a wallet address belonging to the wallet address set and determining that the data of the network outgoing connection corresponds to the malicious mining behavior, on determining that the data of the network outgoing connection comprises a wallet address belonging to the wallet address set.

18 Claims, 5 Drawing Sheets

(56) References Cited

U.S. PATENT DOCUMENTS

| | | | |
|---|---|---|---|
| 2020/0311721 A1* | 10/2020 | Ow | G06Q 20/367 |
| 2020/0387597 A1 | 12/2020 | Karasev et al. | |
| 2021/0160281 A1* | 5/2021 | Hallaji | H04L 63/1425 |
| 2022/0036455 A1* | 2/2022 | Bennett | G06Q 20/3674 |
| 2022/0067752 A1* | 3/2022 | Fang | H04L 9/50 |
| 2022/0101326 A1* | 3/2022 | Kim | H04L 9/50 |

FOREIGN PATENT DOCUMENTS

| | | | |
|---|---|---|---|
| CN | 110619217 A | | 12/2019 |
| CN | 209821835 U | * | 12/2019 |
| CN | 110839088 A | | 2/2020 |
| CN | 112087414 A | | 12/2020 |
| KR | 20190131745 A | | 11/2019 |

* cited by examiner

```
-B -o stratum+tcp://mine.ppxxmr.com:7777 -u

41tPS2hg8rc6DWNXDWG7ngGSrLAaw4zmBeM478r1tkZDGH1y8aFPDiDqAFN8Louy

AXTxtrLVigmRgLXytezCM'Qf1FwzqEi-p x -k --max-cpu-usage=75
```

METHOD AND APPARATUS FOR IDENTIFYING MALICIOUS MINING BEHAVIOR, AND DEVICE AND STORAGE MEDIUM

CROSS REFERENCE OF RELATED APPLICATION

The application is the national phase of PCT International Patent Application No. PCT/CN2021/103572, titled "METHOD AND APPARATUS FOR IDENTIFYING MALICIOUS MINING BEHAVIOR, AND DEVICE AND STORAGE MEDIUM", filed on Jun. 30, 2021, which claims priority to Chinese Patent Application No. 202110463363.9, titled "METHOD AND APPARATUS FOR IDENTIFYING MALICIOUS MINING BEHAVIOR, AND DEVICE AND STORAGE MEDIUM", filed on Apr. 23, 2021 with the China National Intellectual Property Administration, both of which are incorporated herein by reference in their entireties.

FIELD

The present disclosure relates to the field of computers, and in particular to a method and an apparatus for identifying a mining behavior, a device, and a storage medium.

BACKGROUND

With the development of blockchain, many people perform Bitcoin mining for profit. A Bitcoin system generates a random code in a system node at periodic intervals. A computer in the Internet can look for this code. A block is generated when the code is found. Each generation of the block is rewarded with a Bitcoin. Therefore, people are motivated to invest funds to maintain a normal operation of a transaction network of Bitcoins. Such process of finding the code to get a reward is referred to as mining. It takes a significant amount of calculation to calculate an eligible value during the mining. Therefore, some hackers invade a server and control computers of other individuals to carry out the mining.

In a conventional technology, a mining behavior is identified by detecting a certain string feature from a traffic packet. Nevertheless, the detecting may fail due to indeterminacy of features in mining programs under different protocols or different versions, or due to format modification made be an attacker. In the conventional technology, the mining behavior may be further detected by identifying an address of a mining pool. However, the attacker generally does not choose a direct connection to a popular mining pool having a high probability of being detected. The attacker generally connects a mining machine to a proxy address of a mining pool for mining. Such mining pool cannot be accurately located due to indeterminacy of the proxy address of the mining pool. Therefore, an accuracy of detecting the mining behavior is degraded.

SUMMARY

In view of this, an objective of the present disclosure is to provide a method and an apparatus for identifying a malicious mining behavior, a device, and a medium. Specific solutions are described as follows.

According to a first aspect of the present disclosure, a method for identifying a malicious mining behavior is disclosed. The method includes: obtaining operation data corresponding to a target operation, on capturing of the target operation; extracting a wallet address from the operation data to obtain a wallet address set; obtaining data of a network outgoing connection for external access, and determining whether the data of the network outgoing connection includes a wallet address belonging to the wallet address set; and determining that the data of the network outgoing connection corresponds to the malicious mining behavior, on determining that the data of the network outgoing connection includes a wallet address belonging to the wallet address set.

In an embodiment, the extracting a wallet address from the operation data includes: detecting the wallet address from the operation data by using a preset rule for detecting a wallet address corresponding to the target operation, where the preset rule for detecting a wallet address is to match a key field adjacent to a wallet address by using a regular expression.

In an embodiment, the obtaining operation data corresponding to a target operation, on capturing of the target operation, includes obtaining file content of a modified file as the operation data, on capturing of a file modification behavior; and the detecting the wallet address from the operation data by using a preset rule for detecting a wallet address includes detecting the wallet address from the file content by using a first preset rule for detecting a wallet address corresponding to the file modification behavior.

In an embodiment, the obtaining operation data corresponding to a target operation, on capturing of the target operation, includes obtaining a process execution command argument corresponding to a process creation behavior as the operation data, on capturing of the process creation behavior; and the detecting the wallet address from the operation data by using a preset rule for detecting a wallet address includes detecting the wallet address from the process execution command argument by using a second preset rule for detecting a wallet address corresponding to the process creation behavior.

In an embodiment, the obtaining data of a network outgoing connection for external access, and determining whether the data of the network outgoing connection includes a wallet address belonging to the wallet address set includes: obtaining the data of the network outgoing connection for external access, where the data of the network outgoing connection includes access process information, an access destination address, and a network traffic packet; filtering, based on a preset threshold of a packet length, the network traffic packet to obtain a filtered packet; and determining whether the filtered packet includes a wallet address belonging to the wallet address set.

In an embodiment, the determining that the data of the network outgoing connection corresponds to the malicious mining behavior, on determining that the data of the network outgoing connection includes a wallet address belonging to the wallet address set, includes: determining that the data of the network outgoing connection corresponds to the malicious mining behavior, on determining that the filtered packet includes a wallet address belonging to the wallet address set; and generating a warning message indicating the malicious mining behavior, based on the access process information in the data of the network outgoing connection.

According to a second aspect of the present disclosure, an apparatus for identifying a malicious mining behavior is provided. The apparatus includes: an operation data obtaining module, configured to obtain operation data corresponding to a target operation, on capturing of the target operation; a wallet address obtaining module, configured to extract a wallet address from the operation data to obtain a wallet address set; a detection module, configured to obtain data of a network outgoing connection for external access, and determine whether the data of the network outgoing connection includes a wallet address belonging to the wallet address set; and a behavior determination module, configured to determine that the data of the network outgoing connection corresponds to the malicious mining behavior, in a case that the detection module determines that the data of the network outgoing connection includes a wallet address belonging to the wallet address set.

In an embodiment, the wallet address obtaining module includes: a wallet address detection unit, configured to detect the wallet address from the operation data by using a preset rule for detecting a wallet address corresponding to the target operation, where the preset rule for detecting a wallet address is to match a key field adjacent to a wallet address by using a regular expression According to a third aspect of the present disclosure, an electronic device is provided. The electronic device includes: a memory storing a computer program; and a processor. The computer program, when executed by the processor, configures the electronic device to implement the method for identifying a malicious mining behavior.

According to a fourth aspect of the present disclosure, a computer-readable storage medium is provided. The computer-readable storage medium stores a computer program. The computer program, when executed by a processor, is configured to implement the method for identifying a malicious mining behavior.

According to the embodiments of the present disclosure, the operation data corresponding to the target operation is obtained on capturing of the target operation. The wallet address is extracted from the operation data to obtain the wallet address set. The data of the network outgoing connection for external access is obtained, and it is determined whether the data of the network outgoing connection includes a wallet address belonging to the wallet address set. It is determined that the data of the network outgoing connection corresponds to the malicious mining behavior, on determining that the data of the network outgoing connection includes a wallet address belonging to the wallet address set. As can be seen, the wallet address is extracted from the operation data corresponding to the target operation, and the data of the network outgoing connection is monitored. In a case that the data of the network outgoing connection includes the wallet address, it is determined that the traffic data corresponds to a process of the malicious mining behavior. Since the wallet address is necessary for obtaining profits in the malicious mining, the wallet address for login to mining is utilized to identify the malicious mining behavior. Thereby, an ability of identifying the malicious mining is improved.

BRIEF DESCRIPTION OF THE DRAWINGS

For clearer illustration of the technical solutions according to embodiments of the present disclosure or conventional techniques, hereinafter briefly described are the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

DETAILED DESCRIPTION

In a conventional technology, a mining behavior is identified by detecting a certain string feature from a traffic packet. Nevertheless, the detecting may fail due to indeterminacy of features in mining programs under different protocols or different versions, or format modification made be an attacker. In the conventional technology, the mining behavior may be further detected by identifying an address of a mining pool. However, the attacker generally does not choose a direct connect to a popular mining pool with a high probability of being detected. The attacker generally connects a mining machine to a proxy address of a mining pool for mining. Such mining pool cannot be accurately located due to indeterminacy of the proxy address of the mining pool. Therefore, an accuracy of detecting the mining behavior is reduced.

In order to overcome the above technical problems, a method for identifying a malicious mining behavior is provided according to the present disclosure, with which the accuracy of identifying the malicious mining behavior is improved.

Figure 1:
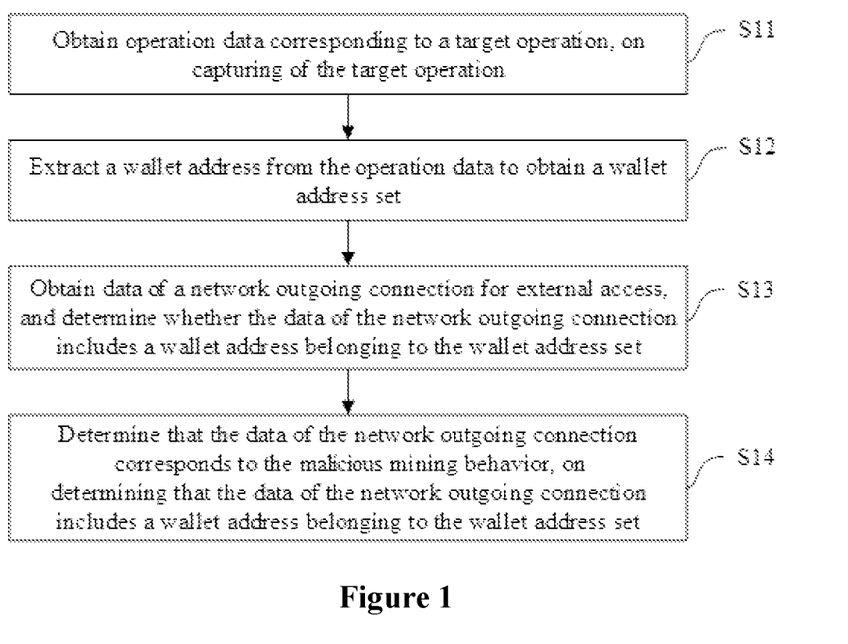
FIG. 1 is a flow chart of a method for identifying a malicious mining behavior according to an embodiment of the present disclosure.

According to an embodiment of the present disclosure, a method for identifying a malicious mining behavior is provided. Reference is made to FIG. 1. The method may include steps S11 to S14 as follows.

In step S11, operation data corresponding to a target operation is obtained on capturing of the target operation.

In an embodiment, an operation of a local operating system is captured. When the target operation is captured, the operation data corresponding to the target operation is obtained.

A certain operation is performed during a mining process, and the operation data corresponding to the operation include a wallet address for the mining. Therefore, the operation data corresponding to the operation is obtained on capturing of the operation. The target operation may include, but not limited to, file modification, process creation, and the like.

In step S12, a wallet address is extracted from the operation data to obtain a wallet address set.

In an embodiment, after the operation data is obtained, the wallet address for the mining is extracted from the operation data to obtain a wallet address set.

In an embodiment, extracting the wallet address from the operation data may include the following steps. The wallet address is detected from the operation data by using a preset rule for detecting a wallet address corresponding to the target operation. The preset rule for detecting a wallet address is to match a key field adjacent to a wallet address by using a regular expression. It can be understood that different rules for detecting a wallet address can be preset for different types of operation data generated by different operations, depending on characteristics of the operation data. Detection on the operation data, after obtained, is performed by using the preset rule for detecting a wallet address corresponding to the operation to extract the wallet address. The preset rule for detecting a wallet address may be matching a key field adjacent to a wallet address by using a regular expression. For example, depending on a characteristic of the operation data, the wallet address is located after a certain field. Therefore, a target key field is matched by using the regular expression, and then a location of the wallet address is determined and the wallet address extracted.

In step S13, data of a network outgoing connection for external access is obtained, and it is determined whether the data of the network outgoing connection includes a wallet address belonging to the wallet address set.

In an embodiment, the data of the network outgoing connection generated during a local-to-external access is collected. It is then determined, based on the wallet address set, whether the data of the network outgoing connection includes a wallet address belonging to the wallet address set.

In step S14, it is determined that the data of the network outgoing connection corresponds to the malicious mining behavior, on determining that the data of the network outgoing connection includes a wallet address belonging to the wallet address set.

In an embodiment, in a case that the data of the network outgoing connection includes a wallet address belonging to the wallet address set, the data of network outgoing external connection may include data for the malicious mining generated due to a hacker invading a server and controlling the server to carry out the malicious mining. Therefore, it is determined that the data of the network outgoing connection corresponds to the malicious mining behavior.

According to the embodiment, the operation data corresponding to the target operation is obtained on capturing of the target operation. The wallet address is extracted from the operation data to obtain the wallet address set. The data of the network outgoing connection for external access is obtained, and it is determined whether the data of the network outgoing connection includes a wallet address belonging to the wallet address set. It is determined that the data of the network outgoing connection corresponds to the malicious mining behavior, on determining that the data of the network outgoing connection includes a wallet address belonging to the wallet address set. As can be seen, the wallet address is extracted from the operation data corresponding to the target operation, and the data of the network outgoing connection is monitored. In a case that the data of the network outgoing connection includes the wallet address, it is determined that the traffic data corresponds to a process of the malicious mining behavior. Since the wallet address is necessary for obtaining profits in the malicious mining, the wallet address for login to mining is utilized to identify the malicious mining behavior. Thereby, an ability and accuracy of identifying the malicious mining is improved.

Figure 2:
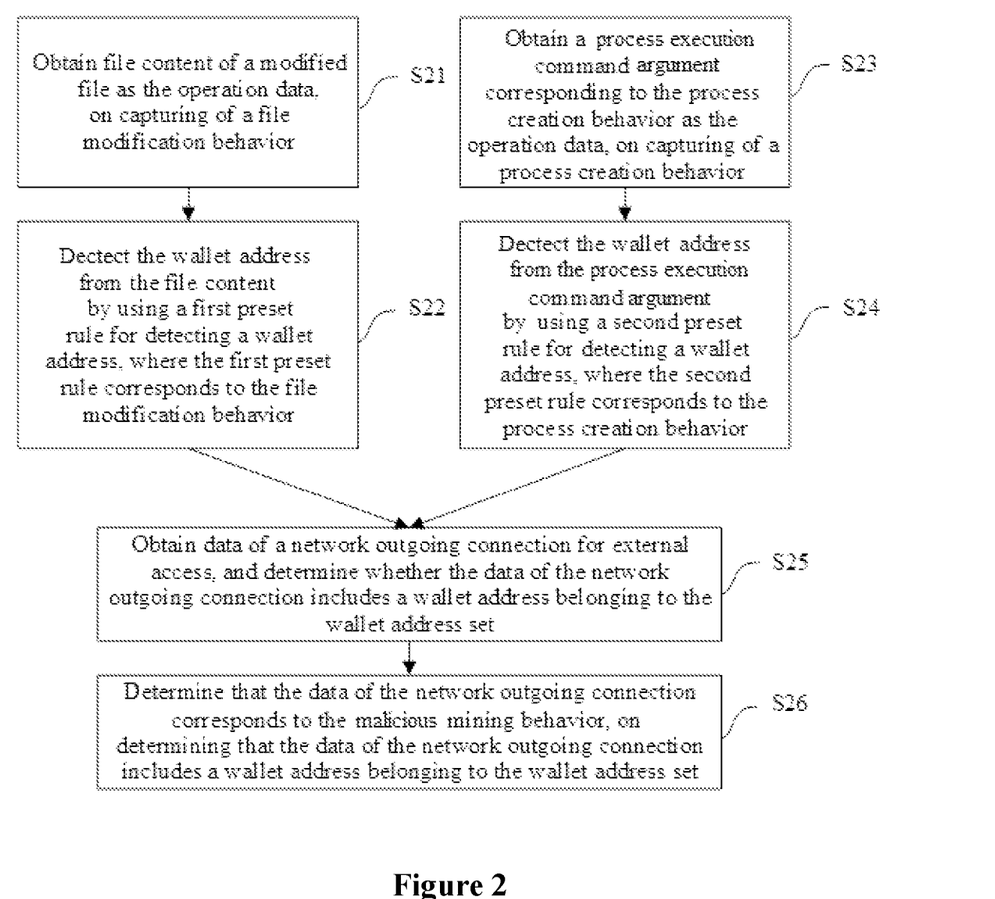
FIG. 2 is a flow chart of a method for identifying a malicious mining behavior according to a embodiment of the present disclosure.

A method for identifying a malicious mining behavior is further provided according to a further embodiment of the present disclosure. Reference is made to FIG. 2. The method may include the steps S21 to S26 as follows.

In step S21, file content of a modified file is obtained, on capturing of a file modification behavior.

In an implementation, in a case that the file modification behavior is captured, the file content of the modified file corresponding to the file modification behavior is obtained. It can be understood that the file modification behavior is the target operation mentioned in the previous embodiment, and the file content is the operation data mentioned in the previous embodiment.

In step S22, the wallet address is detected from the file content by using a first preset rule for detecting a wallet address corresponding to the file modification behavior.

In an implementation, after the file content is obtained, detection on the file content is performed by using the first preset rule for detecting a wallet address corresponding to the file modification behavior, so as to extract the wallet address in the file content. The first preset rule for detecting a wallet address may be matching a key field adjacent to the wallet address by using a regular expression. In other words, a specific target key field is matched with the regular expression, and thereby a location of the wallet address is determined based on the target key field under a data rule. Therefore, the wallet address is extracted. As an example, the wallet address may appear after a field "login" in the file content, and therefore the key field in the first preset rule for detecting a wallet address may include the field "login".

In step S23, a process execution command argument corresponding to a process creation behavior, on capturing of the process creation behavior.

In an implementation, in a case that the process creation behavior is captured, the process execution command argument corresponding to the process creation behavior is obtained. It can be understood that the process creation behavior is the target operation in the previous embodiment, and the process execution command argument is the operation data.

In step S24, the wallet address is detected from the process execution command argument by using a second preset rule for detecting a wallet address corresponding to the process creation behavior.

Figure 3:
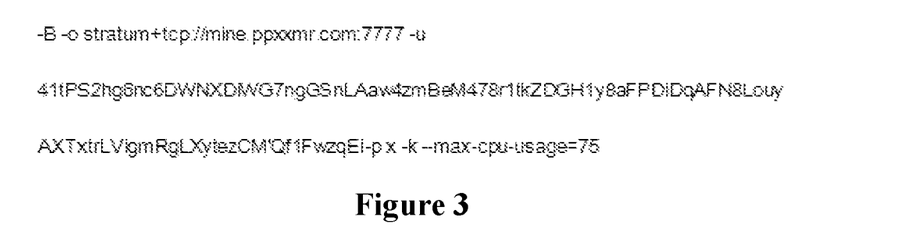
FIG. 3 is a schematic diagram of operating data according to an embodiment of the present disclosure.

In an implementation, after the process execution command argument is obtained, detection on the process execution command argument is performed by using the second preset rule for detecting a wallet address, where the second rule corresponds to the process creation behavior, so as to extract the wallet address in the process execution command argument. The second preset rule for detecting a wallet address may be matching a key field adjacent to the wallet address by using a regular expression. In other words, a specific target key field is matched with the regular expression, and thereby a location of the wallet address is determined based on the target key field under a data rule. Therefore, the wallet address is extracted. Reference is made to FIG. 3. The wallet address in the process execution command argument may appear after a field "—u", and thus the key field in the second preset rule for detecting a wallet address may include the field "-u".

In step S25, data of a network outgoing connection for external access is acquired, and it is determined whether the data of the network outgoing connection includes a wallet address belonging to the wallet address set.

In step S26, it is determined that the data of the network outgoing connection corresponds to the malicious mining behavior, in a case that the data of the network outgoing connection includes a wallet address belonging to the wallet address set.

The step S25 and the step S26 may refer to corresponding content disclosed in the foregoing embodiments, which are not repeated here.

According to the embodiment, the file content of the modified file is obtained on capturing of the file modification behavior. The wallet address is detected from the file content by using the first preset rule for detecting a wallet address corresponding to the file modification behavior. The process execution command argument corresponding to the process creation behavior is obtained on capturing of the process creation behavior. The wallet address is detected from the process execution command argument by using the second preset rule for detecting a wallet address corresponding to the process creation behavior. As can be seen, the file modification behavior and the process creation behavior are monitored, the file content and the process execution command argument are extracted from the monitored behavior, and the wallet address is obtained based on a detection rule. In addition, the data of the network outgoing connection is monitored. In a case that the data of the network outgoing connection includes the wallet address, it is determined that the process includes the malicious mining behavior. Therefore, the accuracy of identifying the malicious mining behavior is improved.

Figure 4:
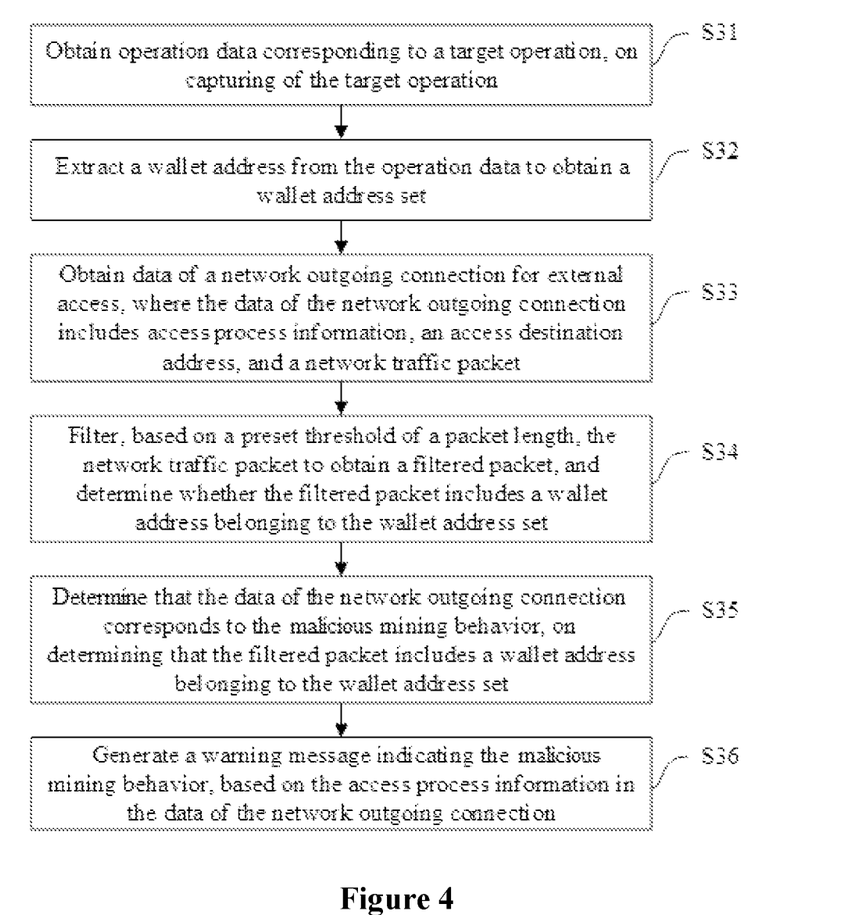
FIG. 4 is a flow chart of a method for identifying a malicious mining behavior according to an embodiment of the present disclosure.

A method for identifying a malicious mining behavior is further provided according to an embodiment of the present disclosure. Reference is made to FIG. 4. The method may include steps S31 to S36 as follows.

In step S31, operation data corresponding to a target operation is obtained on capturing of the target operation.

In step S32, a wallet address is extracted from the operation data to obtain a wallet address set.

In step S33, data of a network outgoing connection for external access is obtained, where the data of the network outgoing connection includes access process information, an access destination address, and a network traffic packet.

In an implementation, the data of the network outgoing connection for a local-to-external access, that is, the data of the network outgoing connection generated during the external access, is collected. The data of the network outgoing connection includes, but is not limited to, the accessed process information, the access destination address, and the access network traffic packet.

In step S34, the network traffic packet is filtered, based on a preset threshold of a packet length, to obtain a filtered packet, and it is determined whether the filtered packet includes a wallet address belonging to the wallet address set.

Figure 5:
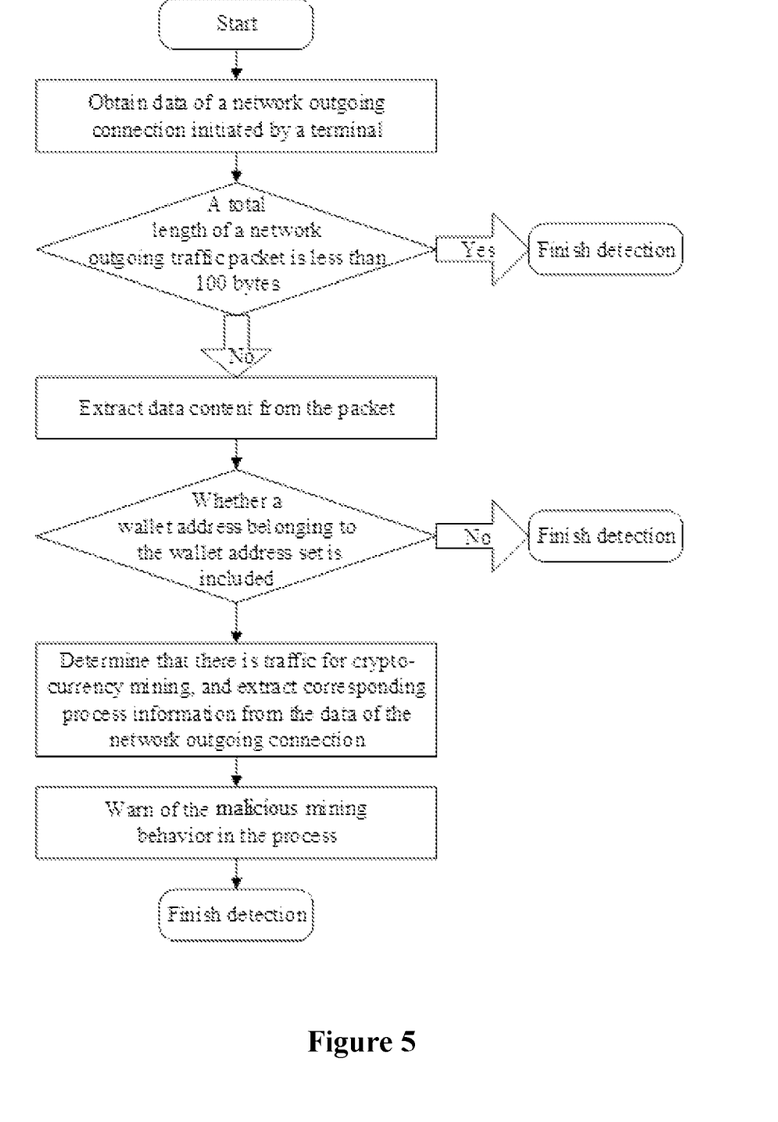
FIG. 5 is a flow chart of a method for identifying a malicious mining behavior according to an embodiment of the present disclosure.

In an implementation, after the network outgoing connection is obtained, the network traffic packet in the data of the network outgoing connection is filtered based on the preset threshold of a packet length, so that the filtered packet is obtained. Reference is made to FIG. 5. It can be understood that, the wallet address for mining is included in the network traffic packet, and a traffic packet for login to mining has a packet length of at least 100 bytes. Therefore, the preset threshold of a packet length may be 100 bytes. That is, after the network traffic packet is obtained, the traffic packet having a length less than 100 bytes is filtered out, so as to obtain the remaining packet as the filtered packet. It is then determined whether the filtered packet includes a wallet address belonging to the wallet address set. Therefore, by filtering the network traffic packet depending on data size and determining whether the wallet address exists in the filtered packet, subsequent workload is reduced, and an efficiency of identifying the wallet address is improved.

In step S35, it is determined that the network outgoing connection corresponds to the malicious mining behavior, on determining that the filtered packet includes a wallet address belonging to the wallet address set.

In an implementation, in a case that the filtered packet includes a wallet address belonging to the wallet address set, it is determined that the data of the network outgoing connection corresponds to the malicious mining behavior. That is, whether there is a wallet address belonging to the wallet address set exists in data content of the packet. In a case that the wallet address exists, it is determined that there is a mining traffic which corresponds to the malicious mining behavior, and the access at the moment may be a request for login to mining.

In step S36, a warning message indicating the malicious mining behavior is generated based on the access process information in the data of the network outgoing connection.

In an implementation, after the malicious mining behavior is determined, for example, the warning message indicating the malicious mining behavior is generated based on the access process information in the data of the network external connection, as shown in FIG. 5. In other words, after the malicious mining behavior is determined, process information for initiating the access is extracted from the data of the network outgoing connection, and the malicious mining behavior in the process is sent to a warning module to remind a terminal user that the terminal is suffering from a mining attack.

According to the embodiment, the data of the network outgoing connection for external access is obtained, where the data of the network outgoing connection includes access process information, the access destination address, and the network traffic packet. The network traffic packet is filtered, based on the preset threshold of a packet length, to obtain the filtered data packet. It is determined whether the filtered packet includes a wallet address belonging to the wallet address set. On determining that the network outgoing connection corresponds to the malicious mining behavior, the warning message indicating the malicious mining behavior is generated based on the access process information in the data of the network outgoing connection. As can be seen, the network traffic packet is filtered with the preset threshold of a packet length, so that a speed of detecting the wallet address is improved. The warning message indicating the malicious mining behavior is generated based on the access process information, so that an administrator is notified of the mining behavior.

Figure 6:
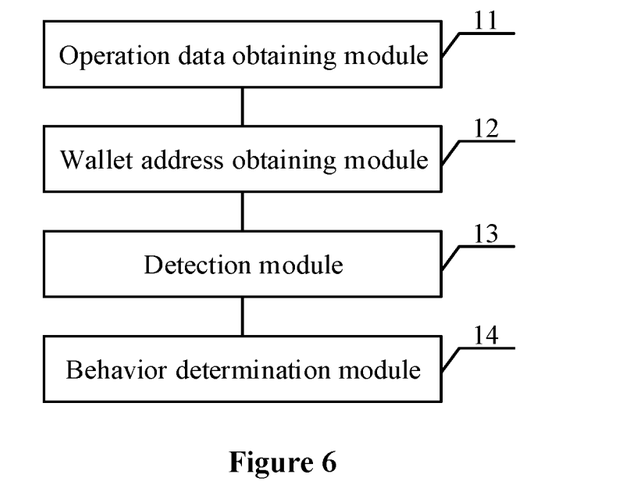
FIG. 6 is a schematic structural diagram of an apparatus for identifying a malicious mining behavior according to an embodiment of the present disclosure.

An apparatus for identifying a malicious mining behavior is further provided according to the present disclosure. Reference is made to FIG. 6. The apparatus includes an operation data obtaining module 11, a wallet address obtaining module 12, a detection module 13, and a behavior determination module 14.

The operation data acquisition module 11 is configured to obtain operation data corresponding to a target operation, on capturing of the target operation.

The wallet address obtaining module 12 is configured to extract a wallet address from the operation data to obtain a wallet address set.

The detection module 13 is configured to obtain data of a network outgoing connection for external access, and determine whether the data of the network outgoing connection includes a wallet address belonging to the wallet address set.

The behavior determination module 14 is configured to determine that the data of the network outgoing connection corresponds to the malicious mining behavior, in a case that the detection module determines that the data of the network outgoing connection includes a wallet address belonging to the wallet address set.

According to the embodiment, the operation data corresponding to the target operation is obtained on capturing of the target operation. The wallet address is extracted from the operation data to obtain the wallet address set. The data of the network outgoing connection for external access is obtained, and it is determined whether the data of the network outgoing connection includes a wallet address belonging to the wallet address set. It is determined that the data of the network outgoing connection corresponds to the malicious mining behavior, on determining that the data of the network outgoing connection includes a wallet address belonging to the wallet address set. As can be seen, the wallet address is extracted from the operation data corresponding to the target operation, and the data of the network outgoing connection is monitored. In a case that the data of the network outgoing connection includes the wallet address, it is determined that the traffic data corresponds to a process of the malicious mining behavior. Since the wallet address is necessary for obtaining profits in the malicious mining, the wallet address for login to mining is utilized to identify the malicious mining behavior. Thereby, the accuracy of identifying the malicious mining is improved.

In a specific embodiment, the wallet address obtaining module 12 may specifically include a wallet address detection unit.

The wallet address detection unit is configured to detect the wallet address from the operation data by using a preset rule for detecting a wallet address corresponding to the target operation. The preset rule for detecting a wallet address is to match a key field adjacent to a wallet address by using a regular expression.

In a specific embodiment, the operation data obtaining module 11 may specifically include a file content obtaining unit and a process execution command argument obtaining unit.

The file content acquisition unit is configured to obtain file content of a modified file as the operation data, on capturing of a file modification behavior.

The process execution command argument obtaining unit is configured to obtain a process execution command argument corresponding to a process creation behavior as the operation data, on capturing of the process creation behavior.

In a specific embodiment, the wallet address detection unit may specifically include a first wallet address detection unit and a second wallet address detection unit.

The first wallet address detection unit is configured to detect the wallet address from the file content by using a first preset rule for detecting a wallet address corresponding to the file modification behavior.

The second wallet address detection unit is configured to detect the wallet address from the process execution command argument by using a second preset rule for detecting a wallet address corresponding to the process creation behavior.

In a specific embodiment, the determination module 13 may specifically include a network outgoing connection data obtaining unit, a filtering unit, and a wallet address determination unit.

The network outgoing connection data obtaining unit is configured to obtain the data of the network outgoing connection for external access, where the data of the network outgoing connection includes access process information, an access destination address, and a network traffic packet.

The filtering unit is configured to filter, based on a preset threshold of a packet length, the network traffic packet to obtain a filtered packet.

The wallet address determination unit is configured to determine whether the filtered packet includes a wallet address belonging to the wallet address set.

In a specific embodiment, the behavior determination module 14 may specifically include a behavior determination unit and a warning unit.

The behavior determination unit is configured to determine that the data of the network outgoing connection corresponds to the malicious mining behavior, on determining that the filtered packet includes a wallet address belonging to the wallet address set.

The warning unit is configured to generate a warning message indicating the malicious mining behavior, based on the access process information in the data of the network outgoing connection.

Figure 7:
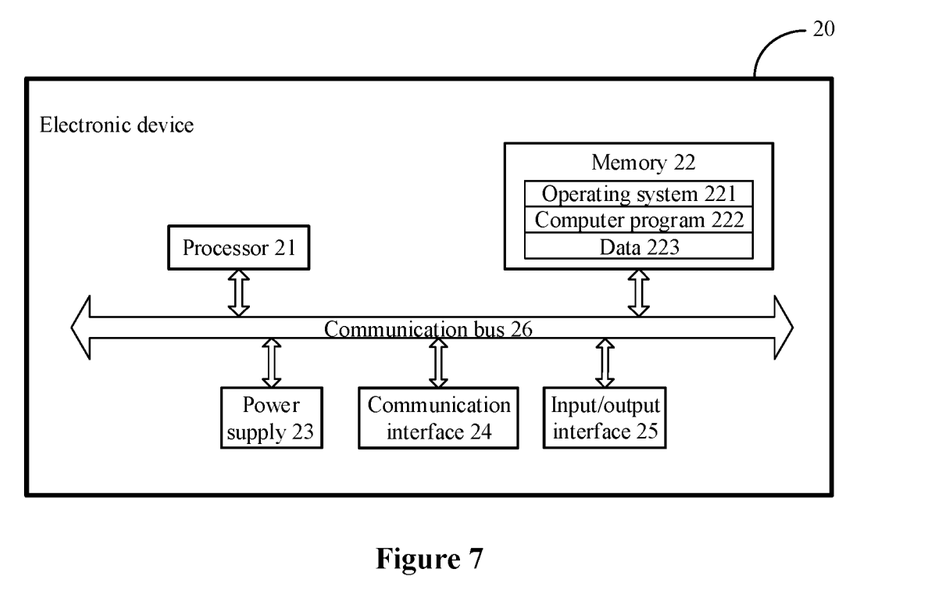
FIG. 7 is a structural diagram of an electronic device according to an embodiment of the present disclosure.

An electronic device is further provided according to an embodiment of the present disclosure. Reference is made to FIG. 7. Content in FIG. 7 should not be constructed as any limitation to the application scope of the present disclosure.

FIG. 7 is a schematic structural diagram of an electronic device 20 according to an embodiment of the present disclosure. The electronic device 20 may specifically include: at least one processor 21, at least one memory 22, a power supply 23, a communication interface 24, an input/output interface 25, and a communication bus 26. The memory 22 stores a computer program. The computer program is loaded and executed by the processor 21 to implement the method for identifying a malicious mining behavior according to any of the foregoing embodiments.

In an embodiment, the power supply 23 is configured to provide an operating voltage for hardware apparatus on the electronic device 20. The communication interface 24 is able to create a data transmission channel between the electronic device 20 and an external device. The data transmission channel follows a communication protocol that is applicable to the technical solution of the present disclosure, which is not specifically limited herein. The input/output interface 25 is configured to receive data from the external or output data to the external. A specific type of the input/output interface may be determined based on a specific application, which is not specifically limited herein.

In addition, the memory 22, as a carrier for resource storage, may be a read-only memory, a random access memory, a magnetic disk, an optical disk, or the like. Resources stored on the memory include an operating system 221, a computer program 222, and data 223 including operation data, and the like. The resources may be stored temporarily or permanently.

The operating system 221 is configured to manage and control hardware apparatus and on the electronic device 20 the computer program 222, in order to realize calculation and processing of the data 223 in the memory 22 through the processor 21. The operating system 221 may be the Windows Server, Netware, Unix, Linux, and the like. The computer program 222 includes a computer program for implementing the method for identifying a malicious mining behavior executed by the electronic device 20 according to any of the foregoing embodiments. The computer program 222 may further include computer programs for carrying out other specific tasks.

Further, a computer storage medium is further provided according to an embodiment of the present disclosure. The computer storage medium stores computer-executable instructions. The computer-executable instructions, when loaded and executed by a processor, implement the method for identifying a malicious mining behavior according to any of the foregoing embodiments.

Herein the embodiments are described in a progressive manner. Each of the embodiments focuses on differences with other embodiments, and the same and similar parts of the embodiments can be referred to each other. Description of the apparatus disclosed in the embodiments is simple, as the apparatus corresponds to the method disclosed in the embodiments. Reference may be made to corresponding description of the method for details of the apparatus.

Steps of the method or algorithm described in conjunction with the embodiments of the present disclosure may be implemented by hardware, a software module executed by a processor, or a combination thereof. The software module may be disposed in a Random Access Memory (RAM), a memory, a Read-Only Memory (ROM), an electrical programmable ROM, an electrically erasable programmable ROM, a register, a hardware disk, a removable magnetic disk, a CD-ROM, or any other storage medium known in the art.

It should be noted that the relationship terminologies such as first, second or the like are used herein to distinguish one entity or operation from another, rather than to necessitate or imply an actual relationship or order among the entities or operations. Furthermore, terms "include", "comprise" or any other variants are intended to cover a non-exclusive inclusion. Therefore, an article or device including a series of elements is not necessarily limited to those expressly listed elements, but may include other elements not expressly listed or inherent to the article, or device. Unless expressively limited otherwise, a statement "comprising (including) one . . . " does not exclude existence of another similar element in the process, method, article or device.

Hereinabove described are the method and the apparatus for identifying a malicious mining behavior, the device and the medium provided in the present disclosure. In this disclosure, specific examples are provided to illustrate the principle and implementations of the present disclosure. Descriptions of the embodiments are only intended to facilitate understanding of the method in the present disclosure and a core idea thereof. Those of ordinary skill in the art can make modifications on the specific implementations and the application scopes based on the idea of the present disclosure. Therefore, the specification should not be construed as a limitation to the present disclosure.

The invention claimed is:

1. A method for identifying a malicious mining behavior, comprising:
    obtaining operation data corresponding to a target operation, on capturing of the target operation;
    extracting a wallet address from the operation data to obtain a wallet address set;
    obtaining data of a network outgoing connection for external access, and determining whether the data of the network outgoing connection comprises a wallet address belonging to the wallet address set; and
    determining that the data of the network outgoing connection corresponds to the malicious mining behavior, on determining that the data of the network outgoing connection comprises a wallet address belonging to the wallet address set.

2. The method according to claim 1, wherein the extracting a wallet address from the operation data comprises:
    detecting the wallet address from the operation data by using a preset rule for detecting a wallet address corresponding to the target operation, wherein the preset rule for detecting a wallet address is to match a key field adjacent to a wallet address by using a regular expression.

3. The method according to claim 2, wherein
the obtaining operation data corresponding to a target operation, on capturing of the target operation, comprises:
    obtaining file content of a modified file as the operation data, on capturing of a file modification behavior; and
the detecting the wallet address from the operation data by using a preset rule for detecting a wallet address comprises:
    detecting the wallet address from the file content by using a first preset rule for detecting a wallet address corresponding to the file modification behavior.

4. The method according to claim 2, wherein
the obtaining operation data corresponding to a target operation, on capturing of the target operation, comprises:
    obtaining a process execution command argument corresponding to a process creation behavior as the operation data, on capturing of the process creation behavior; and
the detecting the wallet address from the operation data by using a preset rule for detecting a wallet address comprises:
    detecting the wallet address from the process execution command argument by using a second preset rule for detecting a wallet address corresponding to the process creation behavior.

5. The method according to claim 1, wherein the obtaining data of a network outgoing connection for external access, and determining whether the data of the network outgoing connection includes a wallet address belonging to the wallet address set comprises:
    obtaining the data of the network outgoing connection for external access, wherein the data of the network outgoing connection comprises access process information, an access destination address, and a network traffic packet;
    filtering, based on a preset threshold of a packet length, the network traffic packet to obtain a filtered packet; and
    determining whether the filtered packet comprises a wallet address belonging to the wallet address set.

6. The method according to claim 5, wherein the determining that the data of the network outgoing connection corresponds to the malicious mining behavior, on determining that the data of the network outgoing connection comprises a wallet address belonging to the wallet address set, comprises:
    determining that the data of the network outgoing connection corresponds to the malicious mining behavior, on determining that the filtered packet comprises a wallet address belonging to the wallet address set; and
    generating a warning message indicating the malicious mining behavior, based on the access process information in the data of the network outgoing connection.

7. An electronic device, comprising:
a memory storing a computer program; and
a processor, wherein
the computer program, when executed by the processor, configures the electronic device to;
obtain operation data corresponding to a target operation, on capturing of the target operation;

extract a wallet address from the operation data to obtain a wallet address set;

obtain data of a network outgoing connection for external access, and determine whether the data of the network outgoing connection comprises a wallet address belonging to the wallet address set; and determine that the data of the network outgoing connection corresponds to the malicious mining behavior, on determining that the data of the network outgoing connection comprises a wallet address belonging to the wallet address set.

8. The electronic device according to claim 7, configured to:

detect the wallet address from the operation data by using a preset rule for detecting a wallet address corresponding to the target operation, wherein the preset rule for detecting a wallet address is to match a key field adjacent to a wallet address by using a regular expression.

9. The electronic device according to claim 8, further configured to:

obtain file content of a modified file as the operation data, on capturing of a file modification behavior; and detect the wallet address from the file content by using a first preset rule for detecting a wallet address corresponding to the file modification behavior.

10. The electronic device according to claim 8, further configured to:

obtain a process execution command argument corresponding to a process creation behavior as the operation data, on capturing of the process creation behavior; and detect the wallet address from the process execution command argument by using a second preset rule for detecting a wallet address corresponding to the process creation behavior.

11. The electronic device according to claim 7, further configured to:

obtain the data of the network outgoing connection for external access, wherein the data of the network outgoing connection comprises access process information, an access destination address, and a network traffic packet;

filter, based on a preset threshold of a packet length, the network traffic packet to obtain a filtered packet; and determine whether the filtered packet comprises a wallet address belonging to the wallet address set.

12. The electronic device according to claim 11, further configured to:

determine that the data of the network outgoing connection corresponds to the malicious mining behavior, on determining that the filtered packet comprises a wallet address belonging to the wallet address set; and generate a warning message indicating the malicious mining behavior, based on the access process information in the data of the network outgoing connection.

13. A non-transitory computer-readable storage medium, storing a computer program, wherein the computer program, when executed by a processor, is configured to:

obtain operation data corresponding to a target operation, on capturing of the target operation;

extract a wallet address from the operation data to obtain a wallet address set;

obtain data of a network outgoing connection for external access, and determine whether the data of the network outgoing connection comprises a wallet address belonging to the wallet address set; and determine that the data of the network outgoing connection corresponds to the malicious mining behavior, on determining that the data of the network outgoing connection comprises a wallet address belonging to the wallet address set.

14. The non-transitory computer-readable storage medium according to claim 13, wherein the computer program, when executed by a processor, is further configured to:

detect the wallet address from the operation data by using a preset rule for detecting a wallet address corresponding to the target operation, wherein the preset rule for detecting a wallet address is to match a key field adjacent to a wallet address by using a regular expression.

15. The non-transitory computer-readable storage medium according to claim 14, wherein the computer program, when executed by a processor, is further configured to:

obtain file content of a modified file as the operation data, on capturing of a file modification behavior; and detect the wallet address from the file content by using a first preset rule for detecting a wallet address corresponding to the file modification behavior.

16. The non-transitory computer-readable storage medium according to claim 14, wherein the computer program, when executed by a processor, is further configured to:

obtain a process execution command argument corresponding to a process creation behavior as the operation data, on capturing of the process creation behavior; and detect the wallet address from the process execution command argument by using a second preset rule for detecting a wallet address corresponding to the process creation behavior.

17. The non-transitory computer-readable storage medium according to claim 13, wherein the computer program, when executed by a processor, is further configured to:

obtain the data of the network outgoing connection for external access, wherein the data of the network outgoing connection comprises access process information, an access destination address, and a network traffic packet;

filter, based on a preset threshold of a packet length, the network traffic packet to obtain a filtered packet; and determine whether the filtered packet comprises a wallet address belonging to the wallet address set.

18. The non-transitory computer-readable storage medium according to claim 17, wherein the computer program, when executed by a processor, is further configured to:

determine that the data of the network outgoing connection corresponds to the malicious mining behavior, on determining that the filtered packet comprises a wallet address belonging to the wallet address set; and generate a warning message indicating the malicious mining behavior, based on the access process information in the data of the network outgoing connection.

* * * * *